United States Patent [19]
Nelson et al.

[11] 3,966,682
[45] June 29, 1976

[54] POLY(TETRAMETHYLENE DIBROMOTEREPHTHALATE)

[75] Inventors: James P. Nelson, Woodridge, Ill.; Alfred Steitz, Jr., deceased, late of Batavia, Ill., by Margaret Marie Steitz, executrix

[73] Assignee: Standard Oil Company, Chicago, Ill.

[22] Filed: June 14, 1974

[21] Appl. No.: 479,473

Related U.S. Application Data
[63] Continuation-in-part of Ser. No. 263,195, June 15, 1972, abandoned.

[52] U.S. Cl. .................... 260/75 H; 260/DIG. 24; 428/480
[51] Int. Cl.² .......................................... C08G 63/68
[58] Field of Search .................. 260/75 H, DIG. 24

[56] References Cited
UNITED STATES PATENTS
3,265,762  8/1966  Quisennberry ...................... 260/860

3,817,935  6/1974  Beer ...................................... 260/75

FOREIGN PATENTS OR APPLICATIONS
968,403  9/1964  United Kingdom

OTHER PUBLICATIONS
Hill et al., *J. Polym. Sci.* 3, 609–612(1948).
Korshak et al., Polyesters, Pergamon Press, New York, 1965, pp. 324–328, 366–367.
Cachia, *Ann. Chim.* 4, 5–43(1959).
Gilbert et al., *Polymer* 13, 327–332(1972).

*Primary Examiner*—Lester L. Lee
*Attorney, Agent, or Firm*—William H. Magidson; Arthur G. Gilkes; William T. McClain

[57] ABSTRACT

This invention relates to poly(tetramethylene 2,5-dibromoterephthalate). More particularly this invention relates to self-extinguishing poly(tetramethylene 2,5-dibromoterephthalate) fibers.

3 Claims, No Drawings

POLY(TETRAMETHYLENE DIBROMOTEREPHTHALATE)

This application is a continuation-in-part of Ser. No. 263,195, filed June 15, 1972 and now abandoned.

With the recent growth in the use of synthetic materials in the textile, construction, automobile, household appliances and aircraft industries there has been increasing concern for the potential and real danger that results in the incidence of damage to property and of personal injury due to the high flammability of these synthetic materials. Concern for public safety has promoted several Government agencies to make inquiries and to propose and enact legislation to impose stricter flammability standards for these synthetic materials. For example, children's sleepwear must meet rigid flammability standards. Garments which can pass this test usually have an L.O.I. (Limiting Oxygen Index) of 26 or more. In response to Governement pressure the makers of synthetic materials are increasing their efforts to impart flame retardant properties to their products. Said manufacturers have in the past used additives containing phosphorous, nitrogen or halogen compounds, said compounds being physically admixed, baked on or affixed to the synthetic materials to impart fire retardancy. However, such additives tend to impart additional and often undesirable properties such as a decrease in strength, an increase in stiffness or an increase in weight of the synthetic materials. Further, it has been observed that these additives may wash off during home laundering in the case of textile synthetics and may be incompatible in the case of synthetic materials used in molding applications.

Another method for imparting flame retardancy is to produce a synthetic material incorporating a flame retarding agent whereby the flame retarding agent is made an integral part of the chemical structure of the synthetic material. One example of this method is the use of dibromopentaerythritol incorporated into the chemical structure of a polyester to impart flame retardancy. However, such synthetic materials tend to be thermally unstable leading to undesirable color formation during preparation. Accordingly, there is a need for a method of producing flame retardant polyesters.

At the present time homopolymeric polyethylene terephthalate is the polyester of choice for use in textile fibers because it has a higher melting point than other polyalkylene terephthalates and its fiber possesses an excellent balance of desirable properties. Unfortunately, when other ester forming components are included in polyethylene terephthalate, the melting point of the polymer decreases and some of the advantageous properties are lost. The higher the concentration of the third ester former, the lower the melting point and the poorer the fiber properties. Further, even the homopolymer's melting point is only marginally acceptable in home dryers and during ironing. Care must be exercised in the drying cycle and during ironing to prevent fiber fusion, etc.

Generally polyethylene terephthalate fibers are blended with hydrophilic fibers, such as cotton, rayon, wool, etc. to provide the textile with aesthetically desirable hand, moisture absorption to minimize static electricity, etc. Unfortunately, blends of polyester and hydrophilic fibers have poorer fire-retardant properties than the individual fibers. For example, it is well-known that textiles prepared from polyester fiber that passes the children's sleepwear test and hydrophilic fiber that passes the children's sleepwear test often fail this test unless each of the component fibers contains substantially more fire-retardant than actually necessary to individually pass this test. This is apparently due to a latticing effect. Accordingly, there is a need for polyesters having a very high concentration of fire-retardants.

Attempts to prepare fire-retardant polyester fibers by replacing part or all of the terephthalic acid moieties in polyethylene terephthalate with, 2,5-dibromoterephthalic acid moieties has been relatively unsuccessful because of the poorer properties of the polymers and fibers. For example, homopolymeric ethylene 2,5-dibromoterephthalate does not crystallize when cooled down from a hot melt and is about 36% crystalline when cast from a solvent and annealed. Failure to crystallize when cooled down from a melt severely limits the potential fiber use since polyester fiber are normally produced by melt spinning (extrusion) and attain maximum physical properties after crystallization of the spun fiber. Studies also indicate that polyethylene terephthalate/2,5-dibromoterephthalate containing more than 12–15 mole percent 2,5-dibromoterephthalate cannot be processed into commercially acceptable fibers due to poor mechanical properties of the fibers. Although polyethylene 2,5-dibromoterephthalate/terephthalate containing at least 10 mole percent 2,5-dibromoterephthalate moieties can provide a polyester having an L.O.I. of at least 26, this leaves (1) an exceeding narrow mole ratio range of acids for producing an unblended polyester fiber capable of meeting today's childrens' sleepwear minimum requirements and (2) may not provide a fiber suitable for blending with hydrophilic fibers which can meet today's childrens' sleepwear minimum requirements. Accordingly, there is a need for fire-retardant polyesters that have good mechanical fiber properties.

The general object of this invention is to provide a fire-retardant polyester having good mechanical fiber properties. Another object of this invention is to provide a fire-retardant polyester having good mechanical fiber properties suitable for use in hydrophilic fiber blends. Other objects appear hereinafter.

The objects of this invention can be attained with a polyester consisting essentially of a dicarboxylic acid component and 1,4-butanediol component wherein the dicarboxylic acid component comprises from 10 to 100 mole percent 2,5-dibromoterephthalic acid moieties and correspondingly 90 to 0 mole percent terephthalic acid moieties. The polyesters of this invention have an L.O.I. of about 26 or higher and have excellent mechanical fiber properties. When the 2,5-dibromoterephthalic acid moiety is between about 55 to 100 mole percent and the terephthalic acid moiety is correspondingly between about 45 to 0 mole percent, the polyester fiber can be used in fire-retardant hydrophilic yarn blends. The homopolymer has maximum fire-retardancy and percent crystallinity after cooling down from a melt. For the purposes of this invention other diols should be avoided to obtain maximum fiber properties.

The polyesters can be produced by reacting, 1,4-butanediol with the free acids or dimethyl esters of the appropriate acids at up to about 260°C.

In somewhat greater detail, dimethyl dibromoterephthalate is mixed in a reaction vessel with 1,4-butanediol with or without dimethyl terephthalate. The reactor is then heated to an esterification temperature of 150-170°C. After the reactants have melted, tetraisopropyl titanate is added as a catalyst. The tetraisopropyl titanate may be added pure or as a solution in n-butanol. After holding the temperature at 150°–180°C. for about 2 hours the temperature is raised to a condensation temperature of 240°–260°C, preferably 250°C, and excess 1,4-butanediol is removed. A vacuum is then applied. The temperature is held at about 250°C while the reaction mixture is under a vacuum for about 2 hours. The product, poly(tetramethylene dibromoterephthalate) is a solid crystalline material of an off-white color. The polyester has a relatively high melting point of 202°–204°C, exhibits a high degree of crystallinity, and a rapid rate of crystallization. Differential thermal analysis indicates that crystallization occurs at 85°C and at 175°–180°C. The glass transition point is 45°C. These thermal properties make the polyester particularly desirable for molding, film, or textile applications where a high degree of flame retardance is needed.

During polyesterification with 1,4-butanediol, dehydration of the diol with the resulting formation of tetrahydrofuran is a serious problem when terephthalic acid or its ester are employed. It has been observed that serious dehydration occurs when dimethyl dibromoterephthalate is polyesterified with 1,4-butanediol using tetraisopropyl titanate as a catalyst. However, upon the addition of tetraisopropyl titanate to the reaction mixture, as a solution in n-butanol, the formation of tetrahydrofuran is dramatically reduced.

As indicated above, polyester crystallinity is an important property in determining the area and extent of the utilization of a polyester. Tenacity, hardness, solvent resistance, melting point and glass transition point, are some of the polymer properties which are influenced by crystallinity.

The crystallinity and relatively high melting point of poly(tetramethylene dibromoterephthalate) prompted further investigation of this property. A sample of poly(tetramethylene 2,5-dibromoterephthalate) was molded into a disc in a hot press, and slowly cooled. This technique was not optimized, yet a high degree of crystallinity was obtained. Several other polyesters were also precipitated from a solution to induce crystallinity so that they could be used for comparison purposes. The technique used was chosen because of the high degree of crystallinity that would result. Discs for an X-ray instrument were cold pressed from precipitated polyester granules. A sample of dimethyl-2,5-dibromoterephthalate was included in a study as a reference, the dimethyl-2,5-dibromoterephthalate exhibited 100% crystallinity. The percent crystallinity for these samples were then determined by X-ray diffraction. The results are shown in Table I.

TABLE I

PERCENT CRYSTALLINITY OF POLYESTERS BASED ON 2,5-DIBROMOTEREPHTHALIC ACID

| Polyester Name | Glycol Component | % Crystallinity | Melting Point °C. |
|---|---|---|---|
| poly(ethylene dibromoterephthalate) | Ethylene | 36 | 180–196 |
| poly(trimethylene dibromoterephthalate) | Trimethylene | 17 | 94–110 |
| poly(tetramethylene dibromoterephthalate) | Tetramethylene | 66 | 202–204 |
| poly(pentamethylene dibromoterephthalate) | Pentamethylene | 43 | 126–139 |

The crystallinity of poly(tetramethylene dibromoterepthalate), of 66%, is unusually high and is nearly double that observed for poly(ethylene 2,5-dibromoterephthalate). The unusually high crystallinity of poly(tetramethylene 2,5-dibromoterephthalate) indicates that fibers made from this material should have high tenacity, and that objects molded from this material should exhibit a high degree of strength and toughness. In addition, it was found that it is difficult to obtain an amorphous form of poly(tetramethylene 2,5-dibromoterephthalate).

The relatively high melting point of poly(tetramethylene 2,5-dibromoterephthalate) may be due to the polyester's unusually high crystallinity since there is apparently a large energy of crystallization. In addition, the rate of crystallization is high. Consideration of a simple molecular model reveals that with slight manipulation, the oxygen in the glycol component can be made to easily coincide and interact with the carbonyl groups of an adjacent polymer chain. This situation could account for the presence of significant intermolecular force between the polymer chains. It is perhaps significant that the d-spacings for poly(tetramethylene 2,5-dibromoterephthalate) are similar to those of dimethyl-2,5-dibromoterephthalate. This indicates that the polyester can achieve an unexpectedly efficient packing in its crystal unit cell.

The relatively high melting point and high degree of crystallinity of the polyesters of this invention is unusual. These properties ordinarily decrease as the number of methylene groups in the alkylene glycol are increased but in this case they increase. Poly(tetramethylene 2,5-dibromoterephthalate) apparently has an unusually high energy of crystallization. These unexpected properties make this polyester much more useful than if its properties were as predicted from its homologs.

The polyesters have an intrinsic viscosity, as defined hereinbelow, in the range of 0.2–1.5, and a bromine content of at least about 7.5%. As indicated above, the polyesters of this invention have unique characteristics that make them desirable for use in fiber applications. The subject polyester's high degree of crystallinity on melt extrusion makes them desirable flame retardant substitutes for many of those applications where poly(ethylene terephthalate) is now used. It has a high percentage of bromine thus providing excellent flame retardancy characteristics.

The preferred polyesters of this invention, wherein at least 55 mole percent of the dicarboxylic acid components are 2,5-dibromoterephthalic acid moieties, are particularly well suited for forming fire-retardant hydrophilic/polyester yarn blends. The polyester component of the blend can comprise from 35 to 85% by weight with correspondingly 65 to 15% by weight hydrophilic yarn depending upon the aesthetic properties desired. Suitable hydrophilic fibers include cotton, wool, linen, silk, rayon, regenerated cellulose, etc.

The term "intrinsic viscosity" as used herein is calculated according to the following equations:

$$\eta \text{intrinsic} = \frac{F}{W}$$

where $$F = \frac{(\eta r - 1 + 3 \ln \eta r)}{16},$$

$W$ = sample weight (gms)

wherein ηr is calculated by dividing the flow time in a capillary viscometer of a dilute solution of polymer by the flow time for the pure solvent.

EXAMPLE I

A mixture of 35.20 grams (0.1 mole) of dimethyl 2,5-dibromoterephthalate and 19.83 grams (0.22 moles) of 1,4-butanediol were combined in a small reactor tube. Both starting materials, the dimethyl 2,5-dibromoterephthalate and the 1,4-butanediol, were purified before use by vacuum distillation. The reactor head was made so that a nitrogen purge tube extended to about one-fourth inch from the bottom of the reactor tube. A vacuum could be applied while a small nitrogen bleed was maintained. The temperature of the oil bath was raised to 160°C. over a period of 20 minutes. When all of the solids were dissolved, 50μl of tetraisopropyl titanate catalyst was injected through the nitrogen bleed tube into the reaction mixture. During this time methanol was emitted. The ester interchange was carried out at 160°C. for 1 hour and then 180°C. for another hour. The oil bath temperature was then raised to a condensation temperature of 250°C., and excess 1,4-butanediol was expelled by a rapid nitrogen bleed for one-half hour. A vacuum was then gradually applied over a period of 10 minutes during which time a slow nitrogen flow was maintained. The oil bath temperature of 250°C. and a vacuum of 1.3 to 0.10 mm Hg was then maintained for a period of 2 hours. After this time the reaction tube was removed from the oil bath and thrust into a metal beaker of liquid nitrogen. The product, poly(tetramethylene 2,5-dibromoterephthalate) was an off-white solid crystalline material. Strands could be cold-drawn, to be necked down, and crystallized to give strong flexible fibers in a manner similar to that of poly(ethylene terephthalate). The polyester fibers can be blended with hydrophilic fibers in the same manner as poly(ethylene terephthalate).

The new polymer was characterized by thermal analysis. Differential thermal analysis showed a Tm of 203°C. and a temperature of crystallization Tc of 154°C. The glass-rubber transition temperature, Tg, was determined by thermal mechanical analysis to be 45°C. A thermal gravimetric analysis revealed poly(tetramethylene 2,5-dibromoterephthalate) to be stable in nitrogen to 320°C. The intrinsic viscosity of the polymer was 0.25 in a 60/40 concentrated solution of phenol/tetrachloroethane held at 30.0°C. The bromine content was analyzed at 39.4% as compared with the calculated value of 41.6% Br. Percent crystallinity as determined by X-ray diffraction from a melt was 66%. The number average molecular weight determined by vapor phase osmometry was found to be 11,400.

EXAMPLE II

Dimethyl terephthalate, 0.08 mole, 15.53 g and dimethyl 2,5-dibromoterephthalate, 0.02 mole, 7.04 g were combined with distilled 1,4-butanediol, 0.22 mole, 19.83 g in the small glass polyesterification apparatus already described. The temperature was raised to 160°C and the solids melted. The catalyst, 50μl tetraisopropyl titanate in 1.0 cc of pure n-butanol was added by syringe through the nitrogen inlet system. By reducing the nitrogen flow to essentially nil, the white cloud usually seen after catalyst addition was eliminated. Transesterification proceeded immediately after the catalyst was added as evidenced by rapid evolution of methanol. After keeping the reactor at 160° for 1 hour, the temperature was raised to 180°C for an hour, then to 250°C for one-half hour. A vacuum was applied gradually and maintained at 0.3 to 0.08 mm Hg for 2 hours while the temperature was maintained at 250°C. The reactor tube of molten polymer was thrust into liquid nitrogen.

The copolyester obtained was white (crystalline) inside and clear, light yellow (amorphous) on the outside. The intrinsic viscosity was 0.69. The bromine content was 10.90 weight % as compared to the calculated value of 12.7%. For the opaque, crystalline portion of the copolyester the Tm was 175°C, the Tc was 140°–155°C and the Tg was 75°C. For the "amorphous" part of the copolyester the Tm was 186°C and the Tg was 76°C. Percent crystallinity as determined by X-ray diffraction from a melt was 27%.

EXAMPLE III

This example illustrates the production of poly(tetramethylene 2,5-dibromoterephthalate) fibers. Poly(tetramethylene 2,5-dibromoterephthalate) homopolymer having an inherent viscosity of about 0.45 was ground on a Wiley mill, vacuum dried overnight at 125°C., melt spun in a ram extruder through a 7-hole, 12-mil diameter hole, spinneret at 220°C at a rate of 0.7 cm³/minute with a yarn take-up rate of 76 feet per minute. The spun yarn was oriented using a draw winder operating with a feed rate of 12 feet per minute and with a platen temperature of 90°C. The yarns were oriented at 3.5, 3.75 and 4.0 times. The results are set forth below in Table II:

TABLE II

| Draw ratio | 3.5 | 3.75 | 4.0 |
|---|---|---|---|
| Denier | 115 | 110 | 95 |
| Tenacity g/d | 2.4 | 2.5 | 3.2 |
| % Elongation at break | 22 | 19 | 17 |
| Tensil factor | 11 | 11 | 13 |

I claim:
1. A fire-retardant polyester consisting essentially of a dicarboxylic acid component and 1,4-butanediol component wherein the dicarboxylic acid component comprises from 10 to 100 mole percent 2,5-dibromoterephthalic acid moieties and correspondingly 90 to 0 mole percent terephthalic acid moieties.
2. The polyester of claim 1, wherein the 2,5-dibromoterephthalic acid moieties are between about 55 and 100 mole percent and the terephthalic acid moieties are between about 45 and 0 mole percent.
3. The polyester of claim 2, wherein the polyester is a homopolymer.

* * * * *